July 20, 1926.
W. D. BRUNGARD
1,593,428
POWER TAKE-OFF FOR MOTOR VEHICLE WHEELS
Filed March 21, 1925
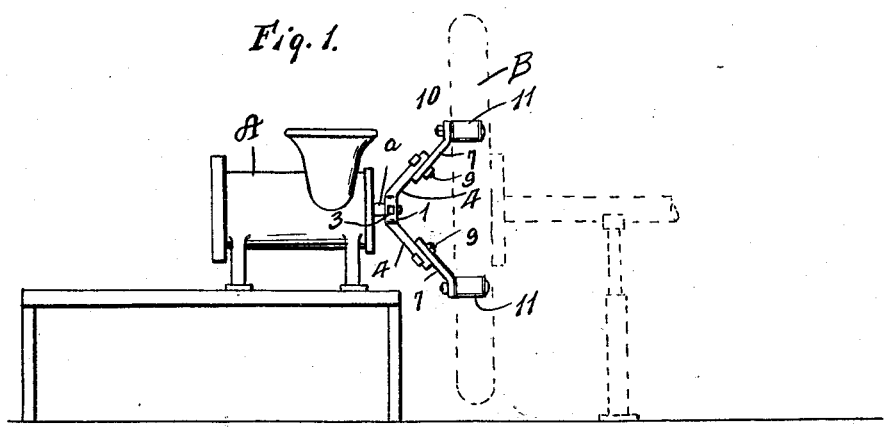
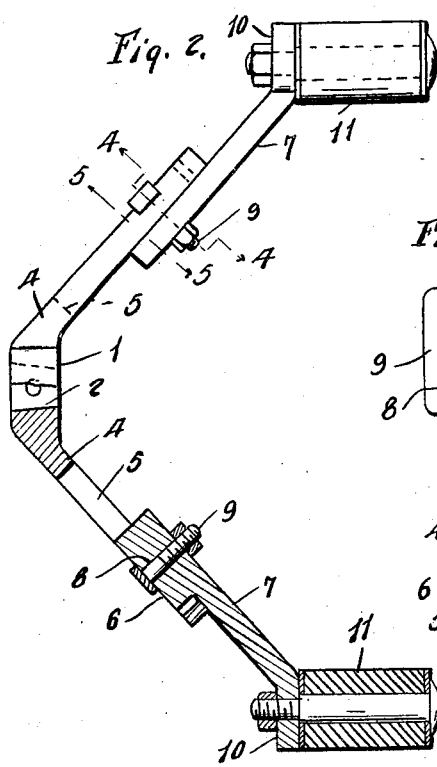
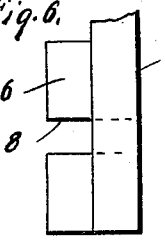
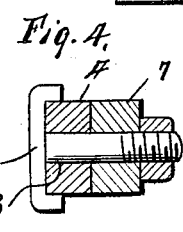
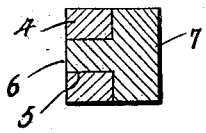
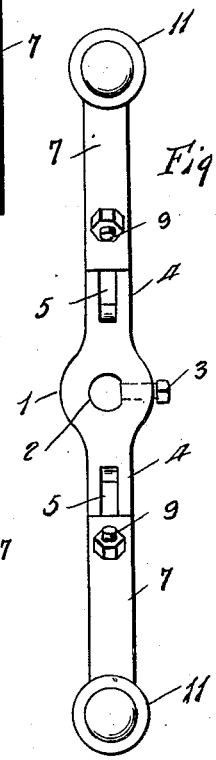
Inventor
W. D. Brungard,
By
Attorney Patented July 20, 1926.

1,593,428

UNITED STATES PATENT OFFICE.

WILLIAM D. BRUNGARD, OF REBERSBURG, PENNSYLVANIA.

POWER TAKE-OFF FOR MOTOR-VEHICLE WHEELS.

Application filed March 21, 1925. Serial No. 17,309.

The invention relates to means for driving machinery such for instance as meat grinders, churns, ice cream freezers, and the like from one of the driving wheels of an automobile or truck, and has for its object the provision of a device of the character stated that will be reasonable in cost of manufacture, and efficient in operation.

A further object of the invention is the provision of means by which the power take-off will be balanced by providing a double armed crank having a means on each arm to engage between the spokes of the vehicle wheel thus adding to the efficiency of the operation of the device.

The details of the construction and operation of the invention, as well as the advantages, will be described in detail hereinafter, and will be found illustrated in the accompanying drawings, in which Figure 1 is a view showing the power take-off in operation on a meat grinder, Figure 2 a view partly in section and on an enlarged scale of the take-off mechanism, the view being taken from a side of the take-off, Figure 3 a front view in elevation, Figure 4 a cross section on a plane indicated by the line 4—4 of Figure 2, Figure 5 a similar view on a plane indicated by the line 5—5 of Figure 2, and Figure 6 a fragmental view on an enlarged scale of one of the arms.

In the drawings similar reference characters will be used to designate corresponding parts throughout the several views.

The power take-off comprises a V-shaped member having a head 1 with an aperture 2 therein shaped to fit a shaft $a$ of a machine to be driven, such as a meat grinder, as disclosed in the drawings, and indicated at A, 3 indicating a set screw to fasten the head 1 on the shaft $a$. The arms 4 of the V-shaped member are each provided with a slot 5, arranged longitudinally thereof to receive a flange 6 on arm 7. Flange 6 and arm 7 are apertured as shown at 8 to receive a T-bolt 9 to secure the arm 7 in adjusted position on arms 4.

The outer ends of arms 7 are formed at an angle to the remainder of the arm as shown at 10, the surface of said ends 10 of the two arms being in coincident planes, and 11 indicate rollers journaled on the ends of said arms, said rollers being preferably made of a non-abrasive material such as rubber, and when in position engaging between the spokes of a motor vehicle wheel B is indicated in Figure 1.

It will be apparent in operation that one of the driving wheels of a motor vehicle will be raised from the ground as indicated in Figure 1 and the machine to be operated then moved into proximity with the driving wheel, and the shaft of the machine to be driven arranged coaxial with the shaft of the motor vehicle. By actuating the driven wheel of the motor vehicle it will be apparent that the machine A will be actuated, and as the wheel will be engaged on opposite sides of the axis of the shaft of the machine A, an equal pressure will be exerted on the two sides of the shaft at all tmes and a more efficient driving of the machine A will be effected.

What is claimed is:—

In a power take-off for motor vehicle wheels, a V-shaped member adapted to engage the driven shaft, the arms of said V-shaped member being longitudinally slotted, other arms having offset portions slidably engaging said slots, and rollers journaled on the last mentioned arms and adapted to engage the vehicle wheel.

In testimony whereof I affix my signature.

WILLIAM D. BRUNGARD.